Aug. 1, 1961   R. J. ENSTROM   2,994,386
CONTROL MECHANISM
Filed March 19, 1958   8 Sheets-Sheet 1

INVENTOR.
RUDOLPH J. ENSTROM
BY
ATTORNEYS

Fig. 3

INVENTOR.
RUDOLPH J. ENSTROM

Fig. 9

INVENTOR.
RUDOLPH J. ENSTROM

Aug. 1, 1961 R. J. ENSTROM 2,994,386
CONTROL MECHANISM
Filed March 19, 1958 8 Sheets-Sheet 6

INVENTOR.
RUDOLPH J. ENSTROM
BY
ATTORNEYS

United States Patent Office 2,994,386
Patented Aug. 1, 1961

2,994,386
CONTROL MECHANISM
Rudolph J. Enstrom, Crystal Falls, Mich., assignor to R. J. Enstrom Corporation, Menominee, Mich., a corporation of Michigan
Filed Mar. 19, 1958, Ser. No. 722,599
8 Claims. (Cl. 170—160.25)

This invention relates to aircraft having rotating blades which act as wings, and particularly to helicopters where the power unit drives the main rotor blades and which depend solely upon variation of the pitch of the rotor blades to give the resultant air flow required to furnish both thrust and lift thereto.

One of the primary objects of this invention is to provide a helicopter with a novel rotary system and controls therefore in which the drive shaft to the rotor blades is a hollow shaft permitting the internal control rod to pass up through the inside thereof without interference, wherein the internal control rod revolves with the hollow drive shaft and the associated arms and blades, since the rotor hub is rigidly secured to the upper end portion of the hollow drive shaft.

It is an object of this invention to provide a helicopter embodying a rotary system having a hollow drive shaft and having the internal control rod extending upwardly therethrough, a rotatable mounted swashplate pivotally secured to the hollow drive shaft by means of a gimbal ring, a main hub for supporting and securing the blades to the hollow shaft, and movable means assembled between the rotor blades and the swashplate for automatically changing the pitch of the rotor blades during rotation thereof.

Still another object of this invention is to provide a helicopter with a rotary system in which the drive shaft is a hollow shaft, with the control rod passing upwardly through the shaft and having an operating main pitch lever connected thereto by suitable members, said lever for governing the vertical location of the control rod for varying the pitch of the rotor blades necessary to provide vertical lift, a pivoted and rotatable swashplate assembled about the exterior of said hollow shaft with the control stick connected thereto by suitable members, said control stick governing the plane of rotation of the swashplate for varying the pitch of the rotor blades necessary to provide forward, backward or sideward travel of the helicopter.

A still further object of this invention resides in the provision of a helicopter with two rotor blades, wherein the pitch of the rotor blades varies automatically according to movement of the swashplate, the blades working against each other to give the helicopter desired direction, one blade increasing in pitch, giving desired lift, and the other blade decreasing in pitch and losing its lift, thereby tilting the helicopter and giving it direction.

And still another object of this invention resides in the provision of a helicopter depending solely upon the variation of the pitch of the rotor blades to give the resultant air flow required to furnish both thrust and lift thereto and having a single torgue compensation auxiliary tail rotor.

It will be seen as the description proceeds, that the invention resides in certain novel features of construction of the rotary system and control means of a helicopter and in the combination and arrangement of the gimbal ring and swashplate forming a part thereof as will be hereinafter more fully described, which, taken in connection with the accompanying drawings, discloses a preferred embodiment thereof.

Figures 1, 2:
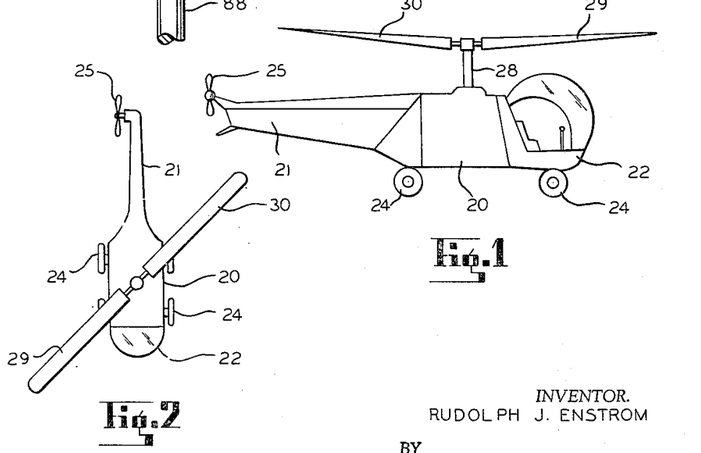
FIGURE 1 represents a diagrammatic side elevation of an aircraft constructed in accordance with this invention.
FIGURE 2 represents a diagrammatic plan of the aircraft of FIGURE 1.
Figure 3:
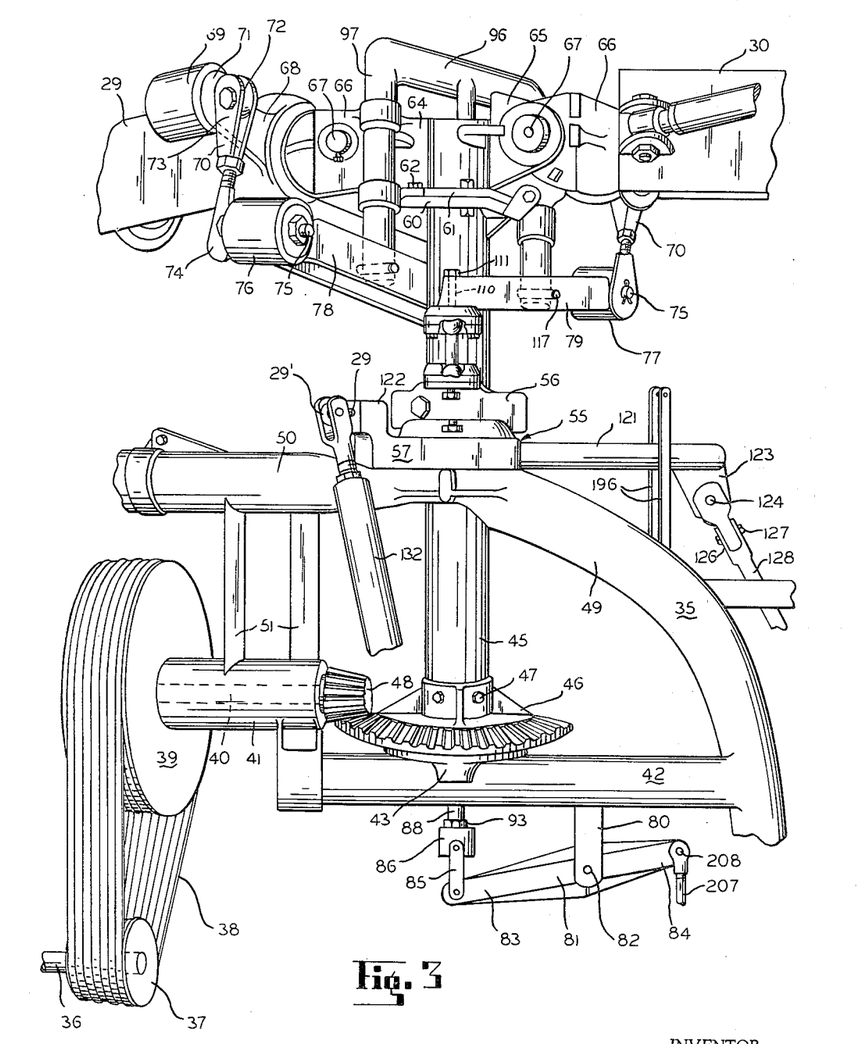
FIGURE 3 is a fragmentary, perspective illustration of the helicopter control system according to this invention.
Figure 14:
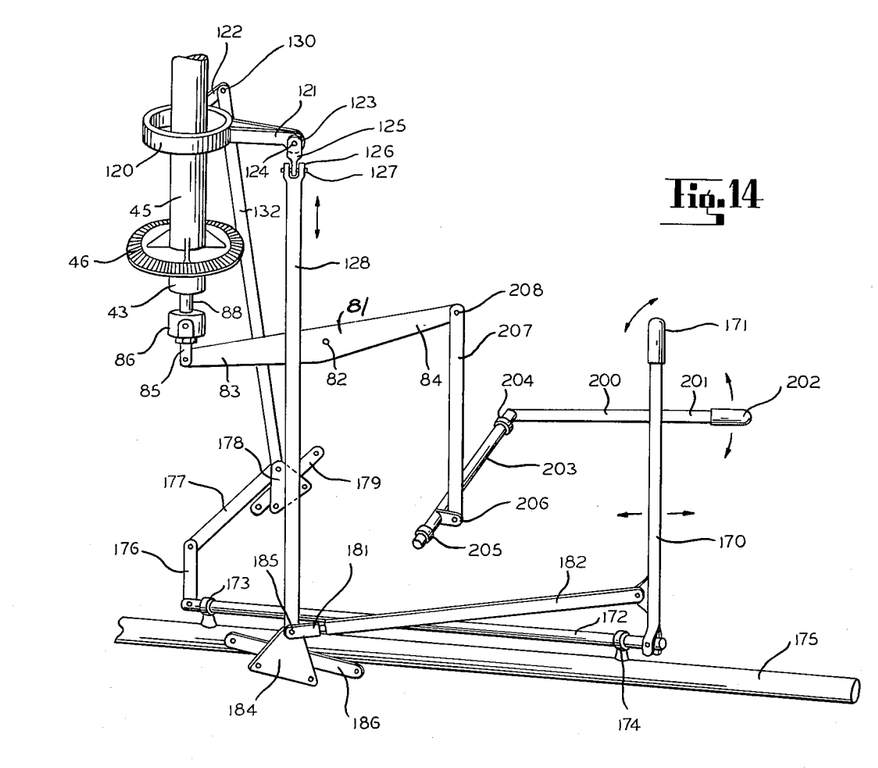
FIGURE 14 represents a fragmentary detail assembly of the control members for operating the control system shown by FIGURE 3.

Referring more in particular to the aforesaid drawings, it will be observed that, in FIGURES 1, 3 and 14, a conventional helicopter is equipped with the invention, the rotor being shown with two blades however more blades may be used if desired. With the engine in operation and the power ready for delivery by the engine, and with the forward edge of both blades elevated, that is, if the cyclic control stick is held in neutral and the collective pitch stick is elevated above its neutral position, the helicopter will climb straight up or take a vertical lift. With the forward edges of both blades lowered below the level point the helicopter will tend to descend. The collective pitch stick is used only for climbing and descending and should it be desired to travel upwardly at an angle, the cyclic control stick is moved from its neutral position in a desired direction. Therefore it is seen that the cyclic control stick is used primarly for controlling attitude and direction. The invention further embodies the use of an anti-torque rotor mounted vertically on the outer portion of the tail boom to increase or decrease tail rotor thrust as required to neutralize the torque effect and keep the fuselage from rotating.

Referring to FIGURES 1 and 2 there is provided a helicopter comprising a fuselage 20, a tail boom 21, a nose or cabin portion 22, landing gear and wheels 24 and tail rotor 25.

As an essential part of the helicopter assembly there is provided a rotatable, hollow, vertical drive shaft 45 carrying rotating airfoil, or blades, 29 and 30 forming a wing system as shown herein in FIGURES 1 and 2 or as shown diagrammatically in FIGURES 3, 9, 10, 11, 12 and 13. The wing system is shown herein with two airfoils, however more airfoils may be embodied with this invention.

By FIGURE 3 the main power and drive shaft supporting frame 35 is shown. The engine drive shaft 36 has a driving pulley 37 mounted thereon. Driving belts 38 are assembled upon said pulley 37 and run about the driven pulley 39 mounted upon the outer end of a pinion shaft 40, said shaft mounted in suitable bearings, not shown, within a cylindrical housing 41 forming an integral part of the frame 35. Said frame 35 embodies a horizontal supporting member 42 with a bearing housing 43 mounted intermediate its ends. A hollow drive shaft 45 is vertically supported by said frame 35 and bearings associated therewith. A ring gear 46 is splined to the lower end of the hollow shaft 45 by set screws 47, said shaft 45 and gear 46 mounted and supported by thrust bearings within said housing 43. A pinion gear 48 is mounted upon the free end of pinion shaft 40 for mating with and for driving said ring gear 46 which drives said hollow shaft 45 and parts connected therewith. Said frame 35 has a curved portion 49 joined in the upper horizontal supporting member 50 which is supported above housing 41 by integral frame members 51. Said supporting member 50 has a vertical aperture therethrough whereby the intermediate portion of said shaft 45 is braced by suitable bearings.

Figure 4:
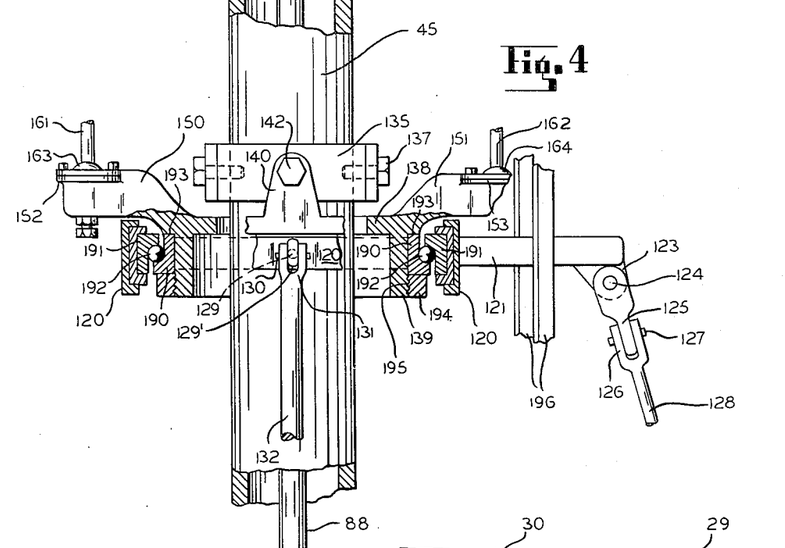
FIGURE 4 is a fragmentary diagrammatic side elevation partially in section of the hollow drive shaft, the gimbal ring, the swashplate and associated levers forming part of the control system according to this invention, some parts shown enlarged for clearness.
Figures 5, 6, 7, 8:
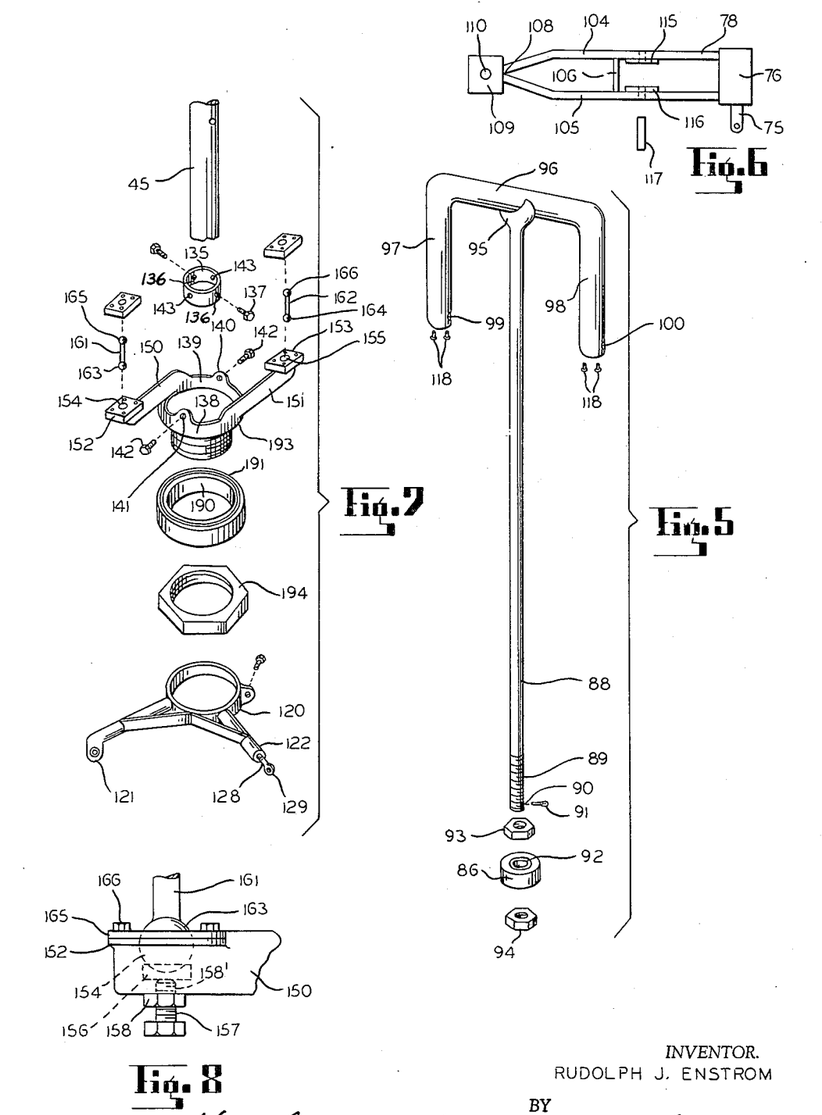
FIGURE 5 is an exploded vertical view of the internal control rod showing the majority of the various component parts.
FIGURE 6 is a plan view of the pivoting linkage arm forming a part of the control system.
FIGURE 7 is an exploded perspective view of the swashplate and associated parts for assembly with the control rod shown by FIGURE 5.
FIGURE 8 is a fragmentary detail view illustrating the ball socket and brass seat adjustable by tap screw and lock nut embodied with this invention.

Referring to FIGURES 3, 4 and 7 there is shown the main rotor hub assembly 55. The upper half of the hub assembly 55 is known as the gimbal ring 56 providing means for tilting the hub in any direction, providing a universal action. The lower half of the hub assembly 55 is known as the yoke assembly 57. This assembly provides the means by which the pitch of the blades 29 and 30 may be changed; as will be described later. Upon the upper end portion of said shaft 45 is secured a shaft flange 60. A rotor hub flange 61 is bolted to said flange 60 by bolts 62, the hub flange 61 being integral with the rotor hub 64 provided with U-shaped brackets 65 for supporting the inner hub portions 66 of said blades 29 and 30 in a substantially horizontal manner by use of rotor hinge pins 67. A horn 68 is secured to the rear hub portion of each of the blades 29 and 30. Each horn 68 supports a journal member in housing 69 on the outer end thereof. A journal 71 is rotatably mounted in said journal member in each of said housings 69 and with the outer end 72 thereof bolted to the upper bifurcated ends 73 of arms 70 depending therefrom. Each arm 70 is provided with a lower adjustable male portion 74 pivotally secured to a journal, or linkage pin 75 mounted in journal members assembled within the cylindrical end housing members 76 and 77 integrally secured to the outer end portions of the control arms 78 and 79.

Extending downwardly from the helicopter frame 42 is a bracket 80 which pivotally supports the collective pitch arm 81 by pin 82 intermediate the ends 83 and 84 of said pitch arm 81. A link 85 connects said one end 83 with a ball bearing housing 86. The internal control rod 88 clearly shown by FIGURES 3 and 5 has a threaded end portion 89 and aperture 90 to receive a cotter pin 91. A double row ball bearing 92 is retained within housing 86 to provide the necessary thrust bearing for the vertical thrust of rod 88. The housing 86 is assembled upon the threaded end portion 89 and held in an adjustable position by a nut 93 assembled above the housing and a nut 94 assembled below the housing and in tight engagement therewith, said cotter pin 91 extending through the aperture 90 to prevent the complete removal of said nut 94 from the control rod 88. The upper end 95 of the control rod 88 has integrally secured therewith, by welding or other means, the U-shaped cross arm 96 with depending arms 97 and 98; said depending arms 97 and 98 being bored transversely thereof to provide apertures 99 and 100. As shown by FIGURE 6, the arm 78 of similar construction as arm 79, is provided with two spaced side bars 104 and 105 secured together by spacer bar 106. The side bars 104 and 105 are attached at one end thereof to the opposite ends of housing 76. The opposite ends of said side bars 104 and 105 are joined together at 108 and secured to a vertical housing 109 with a bore 110 which is threaded to receive the threaded adjusting set screw 111. The side bars 104 and 105 have bored journal members 115 and 116 welded on the inner side walls thereof. In assembly the arms 78 and 79 are fitted upon the depending arms 97 and 98 in a manner to receive the pivot pin 117 which is inserted through apertures 99 and 100 and through the journal members 115 and 116 of each arm. The pins 117 are locked into tight engagement with the arms 97 and 98 by Allen set screws fitted into the threaded apertures in the lower ends thereof. By this arrangement the control arms 78 and 79 are pivotally secured to the ends of the depending arms 97 and 98.

The hub assembly 55 with the yoke assembly 57 and gimbal ring 56 embodied with this invention are clearly shown by FIGURES 3, 4, 7 and 14. The yoke assembly 57 embodies the control clamp 120 with a forward and backward control tube, or arm, 121 and the sideward control tube 122 welded thereto. Tube 121 is provided with a downwardly extending end portion 123 providing a journal member for the journal pin 124 extending horizontally through the upper forked end of the universal member 125 pivotally secured at its lower end to the upper forked end 126 of the forward and backward cyclic extension control rod 128 by pin 127. The tube 122 arranged 90° from tube 121 is provided with a stud 129 with threaded end and assembled therewith. The outer end of said stud 129 is enlarged and bored to provide a journal member 129' for journal pin 130 inserted through apertures in the forked end 131 of the sideward cyclic extension control rod 132 clearly shown by FIGURES 4 and 7. The gimbal ring 56 consists of a universal joint ring 135 mounted upon and about the drive shaft 45. Said ring is provided with one pair of threaded apertures 143. Two of the apertures 136 opposite each other are arranged to receive and be pivotally journaled therewith by journal type bolts 137. The swashplate housing 138 has embodied therewith an annular wall 139 with elevated bosses 140 on opposite sides and bored and threaded to provide apertures 141 to receive journal type bolts 142. The housing 138 is pivotally assembled with the universal-joint ring 135. The bored apertures 143 arranged in the universal-joint ring 135 between apertures 136 are adapted to receive said threaded ends of bolts 142. The gimbal ring 56 permits universal movement of the swashplate housing 138 relative to the drive shaft 45. The housing 138 is provided with two horns 150 and 151 extending upwardly and outwardly from the annular wall 139 intermediate apertures 141 provided therein. The free ends of said horns 150 and 151 are provided with horizontal flanges 152 and 153. Ball sockets 154 and 155 are provided centrally of said flanges 152 and 153. A brass plate 156 with a concave portion is placed below each of said flanges and in horns 150 and 151 to form a thrust plate. A threaded adjusting bolt 157 is assembled in a threaded aperture 158' vertically arranged in said horns and beneath the thrust plates 156. By rotary and vertical movement of said bolts 157 the thrust plate can be raised or lowered as desired, said bolts 157 being locked in adjusted position by lock nuts 158 positioned upon said bolts 157 and arranged to contact the lower surface of the horns supporting the same, as shown by FIGURE 8. Two arms 161 and 162 are provided with balled ends 163, 164, 165 and 166 on the opposite ends thereof. The lower balled ends 163 and 164 are placed in sockets 154 and 155 and secured therein by apertured plates 165 secured to flanges 152 and 153 by bolts 166. The upper balled ends 165 and 166 of said arms 161 and 162 are assembled in ball and socket joints associated with the flanges, the thrust plates, and parts assembled with the lower end of the vertical housings 109, said flanges bolted to the housing 109 by cap screws similar to lower flange bolts 166. The construction of last mentioned flanges, plates and sockets being similar and operate the same as described above regarding flanges 152, 153, sockets 154, 155 and plates 156.

The manual control cyclic pitch stick will now be described as shown clearly by FIGURES 3, 4, and 14. The cyclic stick 170, with handle portion 171 at its upper end, is pivotally secured at its lower end to one end of a rock shaft, or torque tube, 172 journaled at 173 and 174 to a frame member 175. The opposite end of said rock shaft 172 is connected by links 176 and 177 to a carriage 178 movable along an inclined bar or track 179, said carriage connected with the lower end of the cyclic extension control rod 132 attached to tube 122 assembled with yoke assembly 57, the lower portion of the hub assembly 55. Horizontal movement of link 177 caused by sidewise movement of the cyclic stick reciprocates the carriage 178 along the inclined bar 179, and the carriage 178 transmits a vertical reciprocable movement to the controlled rod 132 giving sideward control of the helicopter. Any shock or vibrations imparted to the control rod 132 from the rotor blades indirectly connected with the swashplate is absorbed by the steel bar 179, thereby permitting ease of operation and accuracy of control through the link 177 and substantially eliminating feedback pressures to the link 177 and rock shaft 172, to the cyclic stick 170. Adjacent the lower end of the cyclic stick 170 and above the journal 174, said cyclic stick is pivotally secured to control rod 182 which is connected through a forked swivel means 181 to a carriage 184 and the lower end of control rod 128 by means of a pin 185 extending through the swivel means 181, carriage 184 and rod 128. The carriage 184 is similar to carriage 178 and travels along an inclined bar 186. Horizontal movement of the rod 182 reciprocates the carriage 184 along the inclined bar 186, and the carriage 184 transmits a vertical reciprocable movement to the controlled rod 128 giving forward and/or backward control of the helicopter, since the rod 128 is connected to arm 121 connected with the clamping member 120 of the yoke assembly 57, the lower portion of the hub assembly 55. Backward and forward movement of the cyclic pitch stick imparts the same movement to the rod 182 which imparts the same to carriage 184 along the inclined bar 186. The carriage transmits a vertical reciprocable movement to the control rod 128 resulting in tilting of the swashplate to give indirectly said desired forward and backward movement to the helicopter.

The yoke assembly 57 embodies the control clamp 120 with the forward, backward, sideward arms are described. The gimbal ring 56 consists of ring 135 and swashplate housing 138 in assembled relation. The gimbal ring 56 revolves with the drive shaft 45. The control clamp 120, arm 121, rods 128 and 132, and associated parts must remain stationary. Therefore, an annular bearing with two vertical raceways 190 and 191 and ball bearings 192 therebetween are arranged between the clamp ring 120 and the annular wall 139 of swashplate housing 138. The lower portion of the outer wall of said housing 138 is provided with threads 195. The inner raceway 190 is clamped between an upper ledge 193 of the housing 138 by nut 194 applied to threads 195 on said housing 138. The clamping ring 120 is clamped to the outer raceway 191 providing a frictionless connection between the clamp ring 120 and the gimbal ring, allowing the tubes 121 and 122 to remain stationary as desired. A pair of vertical bars 196 are mounted upon the frame member 49, the bars 196 are suitably spaced to straddle the arm 121 and restrict rotation of the clamping ring 120 but permitting vertical movement of the arm 121 caused by the vertical movement of rod 128. The bars also permit a slight turning action of arm 121 caused by vertical movement of arm 132 arranged 90° therefrom.

The manual control of the collective pitch stick 200 is to be described. The stick 200 is arranged to the left of the operator and operated by raising or lowering the free end 201 thereof. The free end 201 has mounted thereon a motorcycle-type throttle 202. The opposite end of said stick is rigidly secured to a rock shaft 203 journaled at 204 and 205 (see FIGURE 14). A horn 206 extends laterally from the rock shaft 203 and is pivotally secured at its outer end to a vertical link 207. The upper end of link 207 is pivotally secured by a pin 208 to the end 84 of the pitch arm 81, described above.

Figure 9:
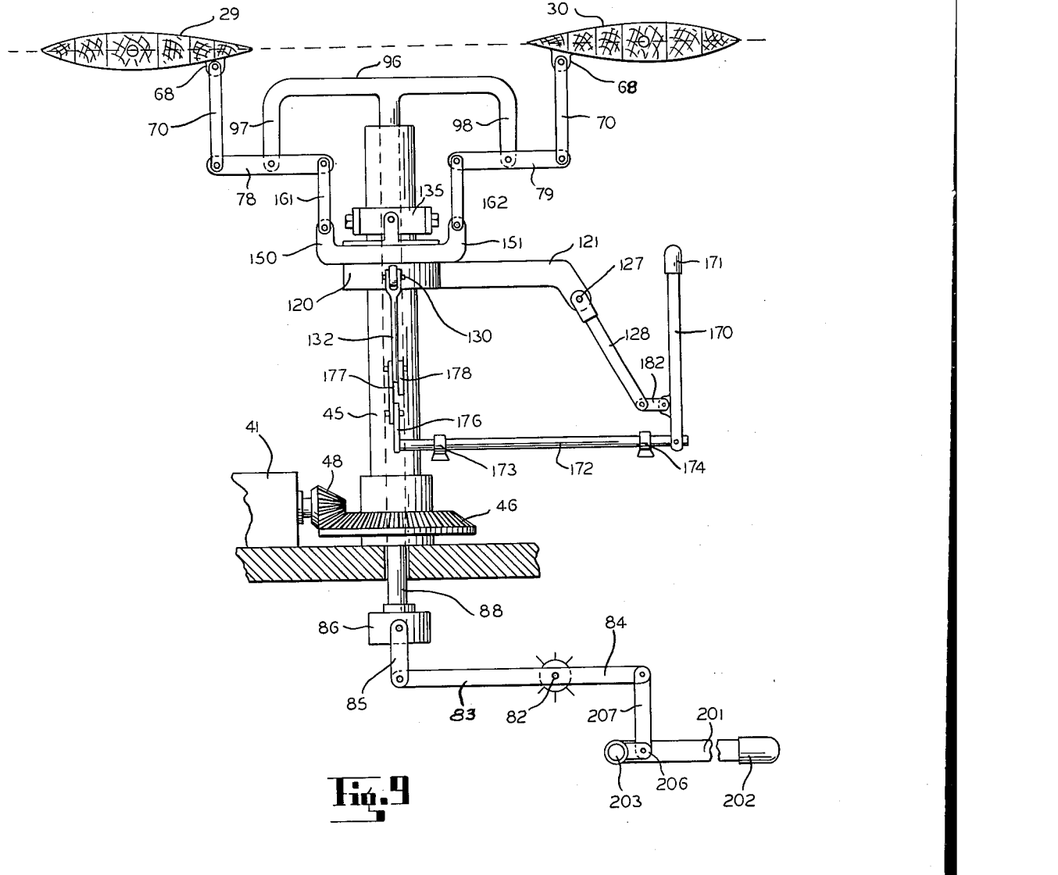
FIGURE 9 is a schematic illustration of the helicopter control system according to this invention with the collective pitch stick, or lever, in a normal horizontal plane, the pitch of both of the blades being the same where two blades are embodied as shown by the drawings.
Figures 10, 15:
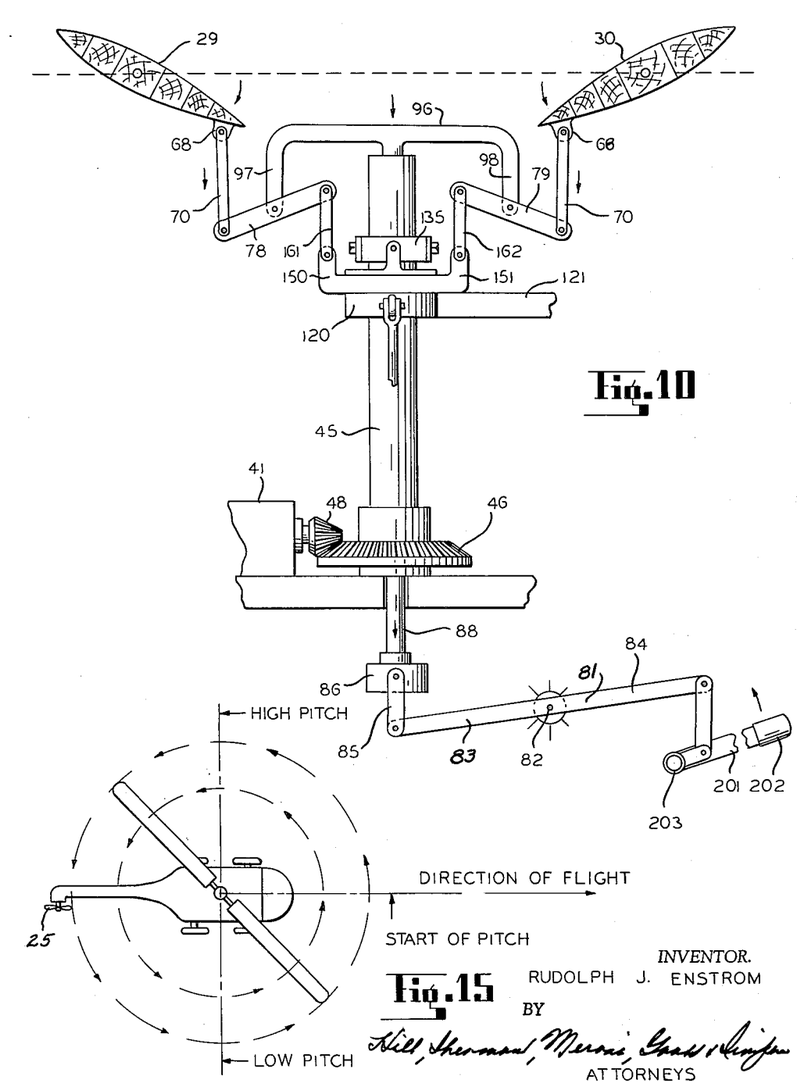
FIGURE 10 is a schematic illustration of the control system shown by FIGURE 9 but with collective pitch stick in elevated position, the pitch of both rotor blades as shown being increased equally.
FIGURE 15 is a diagrammatic plan of the aircraft of FIGURE 1 illustrating the gyroscopic procession of the rotating blades, with control stick held in forward position.
Figures 11, 16:
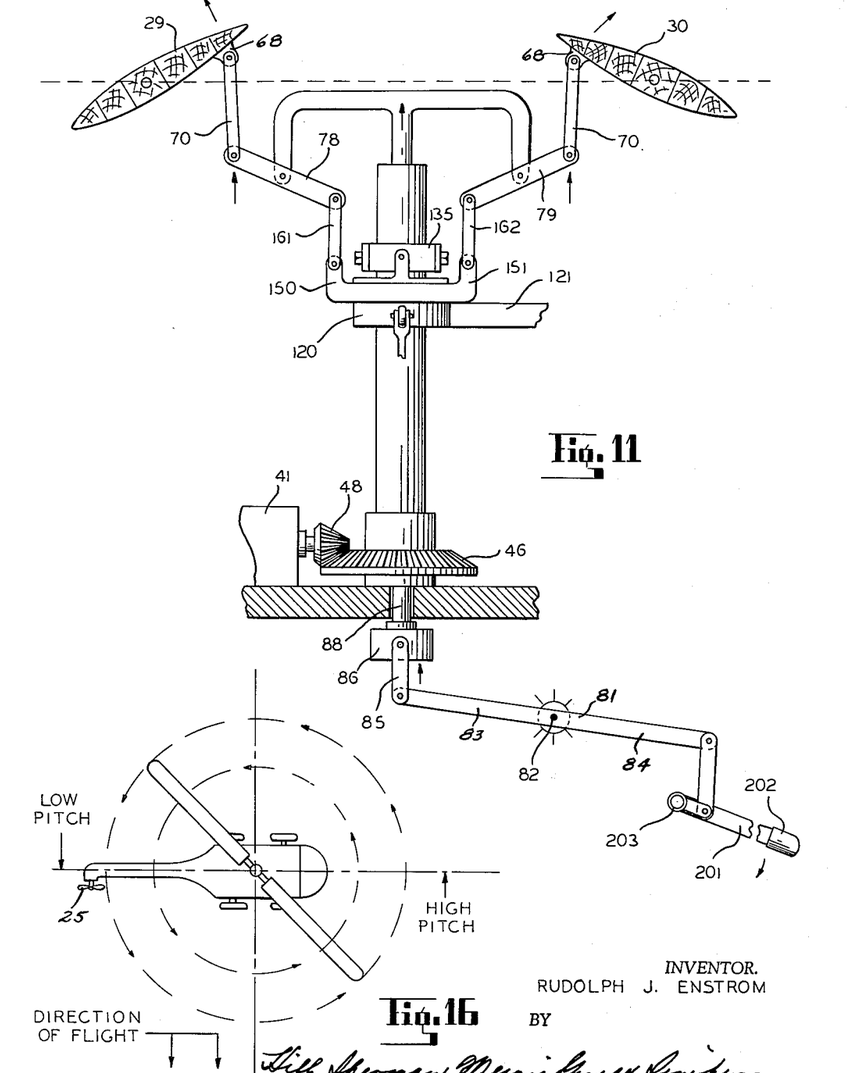
FIGURE 11 is a schematic illustration of the control system shown in FIGURES 9 and 10 but with the collective pitch control stick in lower position, the pitch of both of the blades as shown being decreased equally.
FIGURE 16 is a diagrammatic plan view, similar to FIGURE 15, illustrating the gyroscopic procession of the rotating blades, with the control stick moved to the right and held in said position.

FIGURES 9, 10 and 11 are schematic illustrations of the helicopter control system with the collective pitch stick 201 in three different positions, the normal, the elevated and the lowered positions. When the operator is holding the stick in normal location, it will be observed by FIGURE 9 the control arms 78 and 79 and the blades 29 and 30 are horizontal and both blades are in the same tip-path plane, the imaginary plane described by the tips of the blades in making a cycle of rotation.

When the collective pitch stick is raised as shown by FIGURE 10, the pitch of the main rotor blades is increased. When the collective pitch stick is lowered, or shown by FIGURE 11, the pitch on the blades is decreased. Increasing or decreasing the blade pitch will cause the helicopter to climb or descend. By FIGURE 10, it is seen that when the stick 201 is raised the internal control rod has been lowered, the cross arm 96 is lowered causing the outer ends of the control arms 78 and 79 to be lowered thereby pulling down the inner edges of the blades 29 and 30. By FIGURE 11, it is seen that when the stick 201 is lowered, the internal control rod has been raised thereby pushing upwardly the cross arm 96, causing the outer ends of arms 78 and 79 to be raised thereby pushing up the inner edges of the blades 29 and 30. The swash plate and the gimbal ring of the hub assembly 55 and the arms 161 and 162 have not changed relation to the drive shaft because the ball socket joint arms 161 and 162 cannot move because they are held in place by the swash plate which is held in position by the cyclic stick 170. The control arms 78 and 79 which are connected to the blades 29 and 30 move downward equally during takeoff, this in turn increases the pitch of both rotor blades 29 and 30 equally, thus giving the blades their lift for vertical flight or hovering. By FIGURE 11, as explained above, the stick 201 is lowered and the descent of the helicopter will take place as the control arms 78 and 79 are raised thereby decreasing the pitch of both rotor blades 29 and 30 equally.

Hovering is the maintaining of a position above a fixed spot on the ground, usually at an altitude of about eight feet. Helicopters normally hover on take-offs and landings. For the helicopter to hover, its main rotor must supply lift equal to the helicopter's weight. This is done by controlling the pitch of the rotor blades. As the blades rotate, air flows across the leading edge of each blade in the direction indicated in the illustration below. The air flow crosses the leading edge of each blade throughout the complete rotational cycle of 360°. At the same time, the blades have a tendency to screw upward into the air, and air flows down through the rotor system from above. To maintain a constant blade r.p.m. a synchronization unit is usually linked from the bottom of the pitch stick to the carburetor by a series of push-pull rods. As the blade pitch is increased, calling for more engine power to maintain a constant blade r.p.m., the synchronization unit opens the throttle. The opposite is also true, of course. If the blade pitch is lowered and less engine power is necessary to maintain constant blade r.p.m., the synchronization unit acts to slow engine speed. On the upper end of the collective pitch stick 170 is a motorcycle-type throttle 171, with which the pilot can roll on or roll off throttle, if the synchronization unit does not maintain exact engine r.p.m. This throttle serves to override the synchronization unit so that the specified engine r.p.m. can be maintained. To control the pitch and r.p.m. of the rotor blade 29 and 30, the pilot uses the collective pitch stick. When the collective pitch stick is raised, the pitch on the main rotor blades is increased. When the collective pitch stick is lowered, the pitch on the blades is decreased. If the blades r.p.m. remains constant, increasing or decreasing the blade pitch will cause the helicopter to climb or descend. Vertical flight is controlled exactly the same way as hovering, since hovering is an element of vertical flight. To climb or descend, the pilot raises or lowers the collective pitch stick, using the throttle on the pitch stick to make any r.p.m. adjustments not made automatically. At the same time, he holds the cyclic control, which will be considered next, in a vertical position, so that lift will be vertical. The flow of air is still over the leading edge of each blade, and the helicopter is moving upward as shown by FIGURE 10. When the helicopter is climbing vertically, the main rotor supplies not only the lift necessary to support the helicopter's weight, but also the thrust necessary to cause the helicopter to rise vertically. The power used only for lift while hovering now is divided between lift and thrust, in the same vertical direction.

Figure 12:
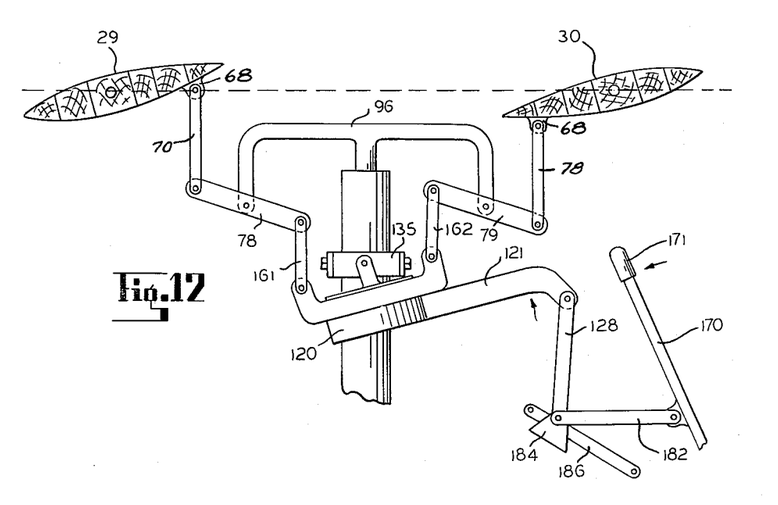
FIGURE 12 is a fragmentary schematic illustration of the control system similar to that shown by FIGURE 9, but with the swashplate tilted forwardly and downwardly due to forward position of the cyclic control stick said position of the cyclic control stick decreasing the pitch of one of the blades and at the same time increasing the pitch of the opposite blade, whereby the helicopter cabin drops slightly below the normal horizontal plane, and the helicopter tending to go forward.
Figure 13:
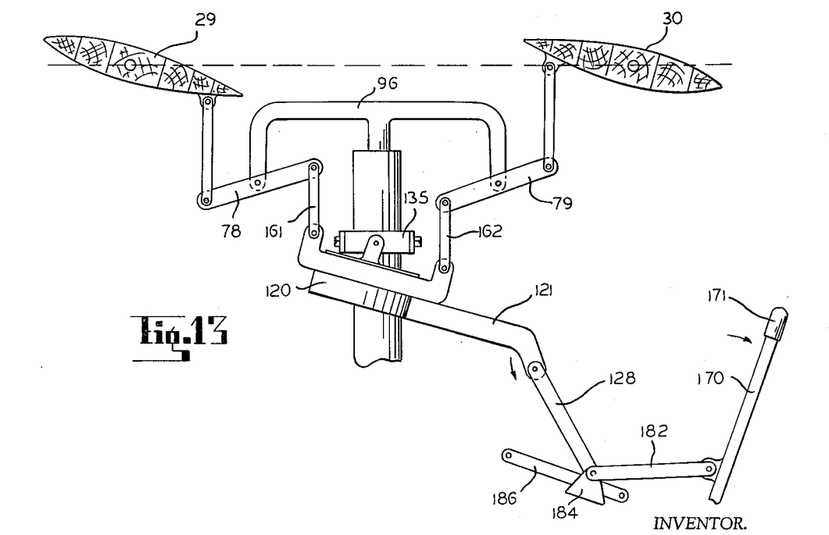
FIGURE 13 is a fragmentary schematic illustration of the control system similar to that shown by FIGURE 12, but with the swashplate tilted rearwardly and downwardly due to rearward position of control stick, whereby the tail end of the helicopter drops slightly below the normal horizontal plane, and the helicopter tends to slip backwards.

Horizontal flight is controlled by tilting the tip path plane in the direction of desired travel, forward, backward, to the left or to the right. This causes the tip path plane to tilt in the same direction as the cyclic control stick as shown by FIGURES 12 and 13. The tilting of the tip path plane is accomplished by the cyclic pitch control, a mechanical means of changing the pitch of the main rotor blades throughout their cycle of rotation. Cyclic pitch change is equal and opposite. If the blade is increased 3° on one side of the rotor system, at a point 180° around in the cycle of rotation the blade pitch will be decreased 3°. For each pitch change there will be a resulting flapping action of the individual blades, as they constantly change pitch during rotation. Maximum flapping will take place 90° around the cycle of rotation from the place where the pitch change was applied. The equal and opposite pitch change and the resulting flapping of the individual blades causes the tip path plane to tilt in the same direction as the pilot moves the cyclic control stick, and as described later with regard to FIGURES 9, 15 and 16.

To climb or descend while moving forward, backward, or to either side is merely a matter of coordinating the movements of the collective pitch control 201, which governs vertical flight, and the cyclic control 170, which governs horizontal flight. As described the swashplate encircles the mast near its base. It is mounted on a gimbal type support so that it may be tilted in any direction. A movement of the cyclic control stick 201 results in a corresponding tilt of the swashplate through linkage and lever the inclination of the swashplate is changed. The rotor blade collective pitch change is effected by the vertical movement of the arms 161 and 162 attached to the swashplate sockets. Since the swashplate is mounted entirely on the gimbal ring, by the use of forward and backward control and side control the swashplate can be tipped and held at any angle throughout 360° of a circle. In what ever direction the control stick is moved and held, the swashplate will be moved and held in that given direction and the helicopter will fly in that direction. By FIG. 12, it is shown that the cyclic stick is moved forward to achieve forward flight, the rear portion of the plate is pushed upward causing the forward portion to be moved downward since it pivots on the gimbal ring secured to the shaft 45. Arm 161 is lowered while arm 162 is raised which in turn raises the rear edge of blade 29 and lowers the rear edge of blade 30, decreasing the pitch of blade 29 and increasing the pitch of blade 30.

By FIGURE 13, the cyclic stick 170 is shown to be moved rearwardly, the rear portion of the swashplate is lowered, the forward portion of the plate is raised which increases the pitch of blade 29 and decreases the pitch of blade 30.

By FIGURE 9, the cyclic stick is shown where it can be moved to either side, thereby rotating the shaft 172. If the pilot wants to fly sidewards to the left he moves the cyclic stick to the left. The swashplate tilts to the left. He moves the stick in the desired direction and holds it there and the helicopter will fly in that direction. It is seen that forward and backward control or sideward control is accomplished. The blades work against each other to give the helicopter the desired direction. One blade will increase in pitch, giving lift, the other decreasing in pitch and losing its lift, thereby tilting the helicopter and giving it direction. Gyroscopic procession must be explained with reference to FIGURES 15 and 16. Gyroscopic procession is an innate quality of all rotating bodies, in which an applied force is manifested approximately 90° in the direction of rotation from the point where the force is applied. Thus, if a downward force is applied to the right of the disk area, gyroscopic procession will cause the disk area to tilt to the front, providing that the rotor system is turning from right to left. The applied force is pitch change on the main rotor blades, which is regulated by the cyclic control. Now, in order to simplify directional control, helicopters employ a mechanical linkage which actually places cyclic pitch change of the main rotor blades 90° ahead in the cycle of rotation. Thus, if the cyclic control is moved forward, high pitch is applied to the blade on the pilot's left, and equally lower pitch is applied to the blade on his right. Since every pitch change causes a flap, reaching its maximum approximately 90° around in the cycle of rotation, this flapping causes the disk area to tilt in the direction desired, or forward. As you can see, if this offset linkage was not employed, the pilot would be required to move the cyclic stick 90° out of phase, or to the right when he wanted to tilt the disk area forward, forward when he wanted to tilt the disk area to the left, and so on.

The torque of the helicopter must be mentioned with reference to FIGURE 2. As the helicopter rotor turns in one direction, the fuselage tends to rotate in the opposite direction, therefore the reaction is in a direction opposite to that in which the rotor is driven by the engine and is proportional in magnitude to the power being delivered by the engine. The usual way of counteracting torque in a single main rotor helicopter is by means of an anti-torque rotor as shown by FIGURES 1 and 2. This auxiliary rotor is mounted vertically on outer portion of the tail boom. Turning at a constant r.p.m., usually slightly higher than one-half engine speed, the tail rotor produces thrust in a horizontal plane opposite in direction to the torque reaction developed by the main rotor. Usually, a variable pitch tail rotor is employed and rudder pedals are linked by cables with the pitch change mechanism in the tail rotor gear box. This permits the pilot to increase or decrease tail rotor thrust as required to neutralize the torque effect. The tail rotor and its controls serve as both a means of counteracting torque effect and a means of heading the helicopter in the desired direction of flight. Therefore, the tail rotor control pedals serve as rudder pedals. When the pilot wishes to maintain a constant heading, he keeps just enough pitch in the tail rotor to neutralize torque action.

From the foregoing, it is seen that the present invention provides a simple control system which enables ease of operation and accurateness in control, the drive shaft to the rotor blades shown as a hollow shaft, the internal control rod extending upwardly therethrough without any interference, a swashplate secured to the shaft, the control rod and the swashplate revolving with the drive shaft, whereby the helicopter can be flown in any direction simply by changing the angle of the swashplate.

It will be understood that modifications and variations may be effected without departing from the scope of the novel concepts of the present invention. Therefore, I intend to cover all such modifications and variations as fall within the true spirit and scope of the novel concepts and principles of this invention.

I claim as my invention:

1. A rotative wing system for a helicopter including in combination, a vertical hollow rotary drive shaft, a rotary hub assembled upon said hollow drive shaft adjacent the upper end thereof, a pair of blades pivotally mounted at their inner ends with said hub, a rotatable vertical control rod extending through said hollow drive shaft and extending beyond the upper and lower ends thereof, a U-shaped cross arm member with depending arms secured to the upper end of said control rod, a collective pitch stick, a collective pitch arm pivoted to the frame of the helicopter, means connecting said collective pitch stick with one end of said collective pitch arm, the lower end of said control rod rotatably connected to the other end of said collective pitch arm, a lateral arm member pivotally mounted intermediate its ends with the lower ends of each of said depending arms of said U-shaped cross member, the outer ends of said lateral arm members pivotally linked to horns on said blades, the inner ends of said arm members pivotally connected with hinge means connected with a swashplate mounted upon said drive shaft by a gimbal suspension means, a cyclic pitch stick, and link means connected between said cyclic pitch stick and said swashplate, whereby movement of the cyclic pitch stick will cause tilting of said swashplate for effecting pivotal movement of said blades to effect change in the pitch thereof for controlling the forward, backward and sideward flight of the helicopter, said link means including a carriage in the linkage slidably mounted on an inclined bar with links connected to the carriage at an angle with each other forming a shock absorbing means to isolate reactive forces exerted from said rotor blades from said cyclic pitch stick.

2. A rotating wing system for a helicopter including in combination, a vertical hollow rotary drive shaft, a rotary hub assembled upon said hollow shaft adjacent the upper end thereof, a pair of blades pivotally mounted at their inner ends with said hub, a vertical control rod extending through said hollow drive shaft and extending beyond the upper and lower ends thereof, a U-shaped cross arm member with depending arms secured to the upper end of said control rod, a collective pitch stick, a collective pitch arm pivoted intermediate its ends to the the frame of the helicopter, means connecting said pitch stick with one end of said collective pitch arm, the lower end of said control rod rotatably connected to the other end of said collective pitch arm, a lateral arm embodying two side members pivotally mounted intermediate its ends with the lower ends of each of said depending arms of said U-shaped cross member, the outer ends of said lateral arm members pivotally linked to said blades, the inner end of said arm members pivotally connected with hinge means connected with a swashplate mounted upon and intermediate the ends of said drive shaft by a gimbal suspension means, a cyclic pitch stick, and link means connected between said cyclic pitch stick and said swashplate, whereby movement of the collective pitch stick will cause vertical movement of the control rod and parts associated therewith for effecting equal pivotal movement of said pair of blades effecting change in the pitch thereof for vertical flight of the helicopter and further the movement of the cyclic pitch stick causing tilting of said swashplate for effecting unequal pivotal movement of said blades effecting unequal change in the pitch thereof for controlling the forward, backward and sideward flight of the helicopter, said link means including a carriage slidably mounted on an inclined bar with links connected to the carriage at an angle with each other forming a shock absorbing means to isolate reactive forces exerted by said rotor blades from said cyclic pitch stick.

3. A rotative wing system for a helicopter including in combination, a vertical hollow rotary drive shaft supported upon the frame of the helicopter, a rotary hub assembled upon said hollow drive shaft adjacent the upper end thereof, a pair of blades pivotally mounted at their inner ends with said hub, a vertical control rod extending through said hollow drive shaft and extending beyond the upper and lower ends thereof, a U-shaped cross arm member with depending arms secured to the upper end of said control rod, a collective pitch stick, a collective pitch arm pivoted intermediate its ends to the frame of the helicopter, means connecting said collective pitch stick with one end of said collective pitch arm, the lower end of said control rod rotatably connected to the other end of said collective pitch arm, a lateral arm member pivotally mounted intermediate its ends with the lower ends of each of said depending arms of said U-shaped cross member, the outer ends of said lateral arm members pivotally linked to horns on said blades, the inner ends of said arm members pivotally connected with hinge means connected with a swashplate mounted upon said drive shaft by a gimbal suspension means, a cyclic pitch stick, control means connected between said cyclic pitch stick and said swashplate, said control means including a member inclined with the horizontal, a carriage linearly slidable along said inclined member, the lateral movement of said cyclic pitch stick effecting movement of said carriage on said inclined member and vertical movement of said swashplate causing the pivotal movement of said blades to effect change in the pitch thereof for forward, backward and sideward flight of the helicopter.

4. A rotative wing system for a helicopter including in combination, a vertical hollow rotary drive shaft, a rotary hub assembled upon said hollow drive shaft adjacent the upper end thereof, a pair of blades pivotally mounted at their inner ends with said hub, a horn extending outwardly from each blade, a rotatable vertical control rod extending through said hollow drive shaft and extending beyond the upper and lower ends thereof, a U-shaped cross arm member with depending arms secured to the upper end of said control rod, a collective pitch stick, a collective pitch arm pivoted to the frame of the helicopter, means connecting said collective pitch stick with one end of said collective pitch arm, the lower end of said control rod rotatably connected to the other end of said collective pitch arm, a lateral arm member pivotally mounted intermediate its ends with the lower ends of each of said depending arms of said U-shaped cross member, the outer ends of said lateral arm members pivotally linked to the horns on said blades, the inner ends of said arm member pivotally connected with hinge means connected with a swashplate mounted upon and intermediate the ends of said drive shaft by a gimbal suspension means, a cyclic pitch stick, control means connected between said cyclic pitch stick and said swashplate, said control means including a member inclined with the horizontal, a carriage linearly slidable along said inclined member, the lateral movement of said cyclic pitch stick effecting movement of said carriage on said inclined member and vertical movement of said swashplate causing the pivotal movement of said blades to effect change in the pitch thereof for forward, backward and sideward flight of the helicopter.

5. A rotative wing system for an aircraft including in combination a hollow drive with a free upper end and with the lower end portion rotatably mounted with the frame of the aircraft, a hub assembled upon the exterior of said hollow shaft at the upper end thereof, a pair of rotor blades articulated to the hub, each blade being pivoted independently of the other blade in its own plane of rotation about the axis of the hub, a rotatable control rod extending through said hollow drive shaft and protruding beyond the upper and lower ends thereof, a U-shaped cross arm member embodying depending arms secured to the upper end of said control rod, a lateral arm pivoted to each of said depending arms having one end thereof connected by link means to said rotor blades and the other end thereof connected to a swashplate by a ball socket joint arm, said ball socket joint arm having a ball joint at each end thereof, the ball joint at the upper end of said ball joint arm secured within a ball socket assembled with parts assembled with the inner end of said lateral arm, the ball joint at the lower end of said ball joint arm secured within a ball socket assembled in the bell extending outwardly from the swashplate, said swashplate assembled to said drive shaft by gimbal suspension unit providing a universal joint, said swashplate having an annular base portion with a dual bearing with inner and outer raceways and secured thereto by a threaded locking means, a circular clamping ring mounted upon the outer raceway of said bearing, said clamping ring having an arm extending outwardly and rearwardly of the swashplate, said clamping ring having means extending outwardly and sidewardly of the swashplate and at 90° from said rearward extending arm, a cyclic pitch stick, link means connected between said cyclic pitch stick and said arm extending rearwardly from said clamping means and operated by forward and rearward movement of the cyclic pitch stick, link means connected between said cyclic pitch stick and said arm extending to one side of said clamping ring and operated by sideward movement of the cyclic pitch stick, a collective pitch stick, a collective pitch arm pivoted intermediate its ends to said frame, link means pivotally connected with one end of said collective pitch arm and rotatably connected with the lower end of said rotatable control rod, link means pivotally connected between the other end of said collective pitch arm and said collective pitch stick, whereby movement of the collective pitch stick causes movement of the control rod and the lateral arms and links associated therewith effecting pivotal movement of said pair of blades and changing the pitch thereof for vertical flight of the aircraft during rotation of the rotor blades driven by said hollow drive shaft, control means connecting said cyclic pitch stick with said swashplate, said control means including a member mounted on said frame and inclined with the horizontal, a carriage linearly slidable upon said inclined member, the lateral movement of said cyclic pitch stick in a forward or rearward direction effecting movement of said carriage on said inclined member and tilting movement of the swashplate, said swashplate effecting the pivotal movement of said blades to effect change in the pitch thereof for controlling forward, backward and sideward movement of the aircraft.

6. A rotatable wing system for a helicopter including in combination a hollow drive with a free upper end and with the lower end portion rotatably mounted with the frame of the aircraft, a hub assembled upon the exterior of said hollow shaft at the upper end thereof, a pair of rotor blades articulated to the hub, each blade being pivoted independently of the other blade in its own plane of rotation about the axis of the hub, a rotatable control rod extending through said hollow drive shaft and protruding beyond the upper and lower ends thereof, a cross arm member embodying depending arms secured to the upper end of said control rod, a lateral arm pivoted to each of said depending arms having one end thereof connected by link means to said rotor blades and the other end thereof connected to a swashplate by a ball socket joint arm, said ball socket joint arm having a ball joint at each end thereof, the ball joint at the upper end of said ball joint arm secured within a ball socket assembled with parts assembled with the inner end of said lateral arm, the ball joint at the lower end of said ball joint arm secured within a ball socket assembled in the bell extending outwardly from the swashplate, said swashplate assembled to said drive shaft by gimbal suspension unit providing a universal joint, said swashplate having an annular base portion with a dual bearing with inner and outer raceways and secured thereto by a threaded locking nut, a circular clamping ring mounted upon the outer raceway of said bearing, said clamping ring having an arm extending outwardly and rearwardly of the swashplate, said clamping ring having means extending outwardly and sidewardly of the swashplate and at 90° from said rearward extending arm, a cyclic pitch stick, link means connected between said cyclic pitch stick and said arm extending rearwardly from said clamping means and operated by forward and rearward movement of the cyclic pitch stick, link means connected between said cyclic pitch stick and said arm extending to one side of said clamping ring and operated by sideward movement of the cyclic pitch stick, a collective pitch stick, a collective pitch arm pivoted to said frame, link means pivotally connected with one end of said collective pitch arm and rotatably connected with the lower end of said rotatable control rod, link means pivotally connected between the other end of said collective pitch arm and said collective pitch stick, whereby movement of the collective pitch stick causes movement of the control rod and the lateral arms and links associated therewith effecting pivotal movement of said pair of blades and changing the pitch thereof for vertical flight of the aircraft during rotation of the rotor blades driven by said hollow drive shaft, control means connecting said cyclic pitch stick with said swashplate, said control means including two members mounted on said frame and inclined with the horizontal, a carriage linearly slidable upon each of said inclined members, the lateral movement of said cyclic pitch stick in any direction effecting movement of both of said carriages on said inclined members and tilting movement of the swashplate, said swashplate effecting the pivotal movement of said blades to effect change in the pitch thereof for controlling forward, backward and sideward movement of the aircraft.

7. A control system for a helicopter comprising in combination a power unit, supporting frame, a hollow drive shaft vertically and rotatably supported with the helicopter frame, a ring gear mounted upon the lower end of said drive shaft, a pinion gear and drive shaft assembled with said power unit, said pinion gear in driving contact with said ring gear, said drive shaft rotated by rotation of said ring gear, a hub assembled upon the exterior of said hollow shaft at the upper end thereof, a shaft extending outwardly from two opposite sides of said hub, rotor blades journaled by their inner ends to each of said shafts, a horn extending outwardly from each blade adjacent the journaled end thereof, a rotatable control rod extending through said hollow drive shaft and protruding beyond the upper and lower ends thereof, articulate means connecting the upper end of said rod with each of said horns, a collective pitch stick, a collective pitch arm, link means pivotally connected with one end of said collective pitch arm and rotatively connected with the lower end of said rotatable control rod, link means pivotally connected between the other end of said collective pitch arm and said collective pitch stick, a swashplate assembled about the intermediate portion of said driven shaft by gimbal suspension unit, said gimbal suspension unit providing a universal joint connection between said swashplate and said drive shaft to provide tilting thereof, said swashplate having an annular base with a bearing embodying an inner and outer raceway secured thereto by locking means, a non-rotatable clamping ring mounted upon the outer raceway of said bearing, said clamping ring having two outwardly extending horns, one of said clamping ring horns extending rearwardly and the other of said clamping ring horns extending sidewardly and 90° apart, a cyclic pitch stick, link means connected between said cyclic pitch stick and said horn extending rearwardly from the clamping ring, said link means including a member mounted on said frame and inclined with the horizontal, a carriage linearly slidable along said inclined member, the lateral movement of said cyclic pitch stick effecting movement of said carriage on said inclined members and movement of said rearwardly extending horn on said swashplate, link means connected between said cyclic pitch stick and said horn extending from the side of said clamping ring, said link means including a member mounted on said frame and inclined with the horizontal, a carriage linearly slidable along said inclined member, the lateral movement of said cyclic pitch stick effecting movement of said carriage on said inclined member and vertical movement of said sidewardly extending horn on said swashplate, said swashplate effecting the pivotal movement of said blades to effect change in the pitch thereof for forward, backward and sideward movement of the helicopter, and said control rod effecting change of pitch of the blade for vertical movement of the helicopter.

8. A rotative wing system for a helicopter comprising in combination a vertical hollow drive shaft, a rotary hub assembled upon said hollow shaft adjacent the upper end thereof, rotor blades pivotally mounted at their inner ends to said hub, a vertical control rod extending through said hollow drive shaft and extending beyond the upper end thereof, a U-shaped cross arm member secured to the upper end of the control rod and having downwardly extending ends, means for vertically controlling said vertical control rod, a tilting swashplate mounted for rotation with the drive shaft, pivotal control arms extending outwardly relative to the drive shaft connected at a point intermediate their ends to said ends of the U-shaped cross arm, means connecting the inner ends of the control arms to the swashplate, and means connecting the outer ends of the control arms to the rotor blades for controlling the pivotal position thereof.

References Cited in the file of this patent
UNITED STATES PATENTS

| | | |
|---|---|---|
| 2,519,762 | Hoffmann et al. | Aug. 22, 1950 |
| 2,623,598 | Martin | Dec. 30, 1952 |
| 2,627,929 | Sikorsky | Feb. 10, 1953 |
| 2,630,184 | Seibel | Mar. 3, 1953 |

FOREIGN PATENTS

| | | |
|---|---|---|
| 137,362 | Australia | Jan. 22, 1948 |
| 86,463 | Netherlands | Oct. 15, 1957 |